US006845121B2

(12) United States Patent  
McDonald

(10) Patent No.: US 6,845,121 B2  
(45) Date of Patent: Jan. 18, 2005

(54) OPTICAL ISOLATOR APPARATUS AND METHODS

(75) Inventor: Mark McDonald, Milpitas, CA (US)

(73) Assignee: Intel Corporation, Santa Clara, CA (US)

( * ) Notice: Subject to any disclaimer, the term of this patent is extended or adjusted under 35 U.S.C. 154(b) by 42 days.

(21) Appl. No.: 10/173,513

(22) Filed: Jun. 15, 2002

(65) Prior Publication Data

US 2003/0231690 A1 Dec. 18, 2003

(51) Int. Cl.$^7$ .................................................. H01S 3/00
(52) U.S. Cl. ........................................ 372/703; 372/34
(58) Field of Search ................................ 372/36, 29.02, 372/29.022, 32, 34, 703

(56) References Cited

U.S. PATENT DOCUMENTS

| | | | |
|---|---|---|---|
| 3,788,743 A | | 1/1974 | George |
| 3,899,748 A | | 8/1975 | Bodlaj |
| 3,921,099 A | | 11/1975 | Abrams et al. |
| 3,965,440 A | | 6/1976 | Graves |
| 4,410,992 A | | 10/1983 | Javan |
| 4,460,977 A | | 7/1984 | Shimada et al. |
| 4,730,105 A | | 3/1988 | Mitschke et al. |
| 4,847,854 A | | 7/1989 | Van Dijk |
| 4,934,816 A | | 6/1990 | Silver et al. |
| 5,022,745 A | | 6/1991 | Zayhowski et al. |
| 5,050,179 A | | 9/1991 | Mooradian |
| 5,113,404 A | * | 5/1992 | Gaebe et al. ................. 372/36 |
| 5,124,993 A | | 6/1992 | Braunlich et al. |
| 5,130,998 A | | 7/1992 | Wakata et al. |
| 5,163,063 A | | 11/1992 | Yoshikawa et al. |
| 5,181,214 A | | 1/1993 | Berger et al. |
| 5,214,659 A | | 5/1993 | Terada et al. |
| 5,245,626 A | | 9/1993 | Burke et al. |
| 5,251,222 A | | 10/1993 | Hester et al. |
| 5,263,037 A | | 11/1993 | Trutna, Jr. et al. |
| 5,264,392 A | * | 11/1993 | Gaebe et al. ................. 438/27 |
| 5,289,491 A | | 2/1994 | Dixon |
| 5,331,651 A | | 7/1994 | Becker et al. |
| 5,412,676 A | | 5/1995 | Schnier et al. |
| 5,414,280 A | | 5/1995 | Girmay |
| 5,418,800 A | | 5/1995 | Prior et al. |

(List continued on next page.)

FOREIGN PATENT DOCUMENTS

| | | |
|---|---|---|
| WO | WO 98/05105 | 2/1998 |
| WO | WO 00/49689 | 8/2000 |
| WO | WO 01/04999 A1 | 1/2001 |
| WO | WO 02/078137 A1 | 10/2002 |
| WO | WO 03/005500 A2 | 1/2003 |
| WO | WO 03/005501 A2 | 1/2003 |
| WO | WO 03/005512 A2 | 1/2003 |

OTHER PUBLICATIONS

Ketelsen, L. J. P., "Simple Technique for Measuring Cavity Loss in Semiconductor Lasers," *Electronics Letters*, (Aug. 18, 1994), vol. 30, No. 17, pp. 1422–1424.

Shtengel, G. E., et al., "Internal Optical Loss Measurements in 1.3$\mu$m InGaAsP Lasers," *Electronic Letters*, (Jul. 6, 1995), vol. 31, No. 14, pp. 1157–1159.

*Primary Examiner*—Minsun Oh Harvey  
*Assistant Examiner*—Phillip Nguyen  
(74) *Attorney, Agent, or Firm*—Blakely, Sokoloff, Taylor & Zafman LLP

(57) ABSTRACT

Methods and apparatus for optimizing feedback suppression of optical isolators when used with variable wavelength light sources. The methods comprise positioning an optical isolator in a light beam, and adjusting feedback suppression by the optical isolator according to wavelength of the light beam. Adjusting the feedback suppression may comprise adjusting temperature of the optical isolator or a non-reciprocal rotator associated with the isolator.

15 Claims, 6 Drawing Sheets

U.S. PATENT DOCUMENTS

| | | | |
|---|---|---|---|
| 5,428,700 A | 6/1995 | Hall | |
| 5,444,724 A | 8/1995 | Goto | |
| 5,651,018 A | 7/1997 | Mehuys et al. | |
| 5,673,129 A | 9/1997 | Mizrahi | |
| 5,737,349 A * | 4/1998 | Gaebe | 372/37 |
| 5,751,750 A | 5/1998 | Friede et al. | |
| 5,777,773 A | 7/1998 | Epworth et al. | |
| 5,812,716 A | 9/1998 | Ohishi | |
| 5,848,092 A | 12/1998 | Mitsumoto et al. | |
| 5,862,162 A | 1/1999 | Maeda | |
| 5,872,881 A | 2/1999 | Rossi et al. | |
| 5,917,188 A | 6/1999 | Atkinson et al. | |
| 5,943,352 A | 8/1999 | Fee | |
| 6,018,535 A | 1/2000 | Maeda | |
| 6,018,536 A | 1/2000 | Alphonse | |
| 6,026,100 A | 2/2000 | Maeda | |
| 6,034,799 A | 3/2000 | Hansen | |
| 6,040,950 A | 3/2000 | Broome | |
| 6,043,883 A | 3/2000 | Leckel et al. | |
| 6,044,095 A | 3/2000 | Asano et al. | |
| 6,064,501 A | 5/2000 | Roberts et al. | |
| 6,081,539 A | 6/2000 | Mattori et al. | |
| 6,108,355 A | 8/2000 | Zorabedian | |
| 6,115,121 A | 9/2000 | Erskine | |
| 6,115,401 A | 9/2000 | Scobey et al. | |
| 6,151,337 A | 11/2000 | Carlsten et al. | |
| 6,181,717 B1 | 1/2001 | Kner et al. | |
| 6,201,638 B1 | 3/2001 | Hall et al. | |
| 6,205,159 B1 | 3/2001 | Sesko et al. | |
| 6,215,802 B1 | 4/2001 | Lunt | |
| 6,218,641 B1 * | 4/2001 | Gaebe et al. | 219/121.64 |
| 6,229,835 B1 | 5/2001 | Tomaru et al. | |
| 6,243,403 B1 * | 6/2001 | Broutin et al. | 372/32 |
| 6,249,365 B1 | 6/2001 | Mizrahi et al. | |
| 6,259,712 B1 | 7/2001 | DeCain et al. | |
| 6,263,004 B1 | 7/2001 | Arvidsson et al. | |
| 6,301,274 B1 | 10/2001 | Tayebati et al. | |
| 6,301,280 B1 | 10/2001 | Broutin et al. | |
| 6,304,586 B1 | 10/2001 | Pease et al. | |
| 6,314,115 B1 | 11/2001 | Delfyett et al. | |
| 6,337,660 B1 | 1/2002 | Esman et al. | |
| 6,366,592 B1 | 4/2002 | Flanders | |
| 6,366,689 B1 | 4/2002 | Rao et al. | |
| 6,404,538 B1 | 6/2002 | Chen et al. | |
| 6,422,766 B1 * | 7/2002 | Althaus et al. | 385/94 |
| 6,429,669 B1 * | 8/2002 | Ito et al. | 324/753 |
| 6,441,933 B1 | 8/2002 | Jang | |
| 6,463,085 B1 | 10/2002 | Tayebati | |
| 6,470,036 B1 | 10/2002 | Bailey et al. | |
| 6,526,071 B1 | 2/2003 | Zorabedian et al. | |
| 6,532,091 B1 | 3/2003 | Miyazaki et al. | |
| 6,650,667 B2 * | 11/2003 | Nasu et al. | 372/32 |
| 6,704,332 B2 * | 3/2004 | Chapman et al. | 372/20 |
| 6,724,797 B2 * | 4/2004 | Daiber | 372/92 |
| 2002/0012369 A1 * | 1/2002 | Nasu et al. | 372/36 |
| 2002/0048297 A1 | 4/2002 | Irie et al. | |
| 2002/0054614 A1 | 5/2002 | Jin | |
| 2002/0126345 A1 | 9/2002 | Green et al. | |
| 2002/0136104 A1 | 9/2002 | Daiber | |
| 2003/0007523 A1 * | 1/2003 | Chapman et al. | 372/20 |
| 2003/0007540 A1 * | 1/2003 | Daiber | 372/92 |
| 2003/0039277 A1 * | 2/2003 | Nasu et al. | 372/34 |
| 2003/0044132 A1 * | 3/2003 | Nasu et al. | 385/92 |

* cited by examiner

OPTICAL ISOLATOR APPARATUS AND METHODS

BACKGROUND OF THE INVENTION

There is an increasing demand for tunable lasers for test and measurement uses, wavelength characterization of optical components, fiberoptic networks and other applications. In dense wavelength division multiplexing (DWDM) fiberoptic systems, multiple separate data streams propagate concurrently in a single optical fiber, with each data stream created by the modulated output of a laser at a specific channel frequency or wavelength. Presently, channel separations of approximately 0.4 nanometers in wavelength, or about 50 GHz are achievable, which allows up to 128 channels to be carried by a single fiber within the bandwidth range of currently available fibers and fiber amplifiers. Greater bandwidth requirements will likely result in smaller channel separation in the future.

DWDM systems have largely been based on distributed feedback (DFB) lasers operating with a reference etalon associated in a feedback control loop, with the reference etalon defining the ITU wavelength grid. Statistical variation associated with the manufacture of individual DFB lasers results in a distribution of channel center wavelengths across the wavelength grid, and thus individual DFB transmitters are usable only for a single channel or a small number of adjacent channels.

Continuously tunable external cavity lasers have been developed to overcome the limitations of individual DFB devices. Various laser tuning mechanisms have been developed to provide external cavity wavelength selection, such as mechanically tuned gratings used in transmission and reflection. External cavity lasers must be able to provide a stable, single mode output at selectable wavelengths while effectively suppress lasing associated with external cavity modes that are within the gain bandwidth of the cavity. These goals have been difficult to achieve, and there is accordingly a need for an external cavity laser that provides stable, single mode operation at selectable wavelengths.

An optical isolator is often used with an external cavity laser to prevent unwanted feedback from returning into to the laser from an output path such as an optical fiber. The optimal feedback suppression provided by optical isolators is wavelength-specific. External cavity lasers are tunable over a wavelength range that can be as large as the gain bandwidth (wavelength range) of laser gain medium, and an optical isolator may be able to provide effective feedback suppression over only a small portion of the tunable wavelength range. There is a need for optical isolator apparatus and methods and related laser apparatus and methods, which allow for optimum feedback suppression over extended tunable wavelength ranges. The present invention satisfies this need, as well as others, and overcomes deficiencies found in the background art.

BRIEF DESCRIPTION OF THE DRAWINGS

The invention will be more fully understood by reference to the following drawings, which are for illustrative purposes only.

DETAILED DESCRIPTION OF THE INVENTION

Figure 1:
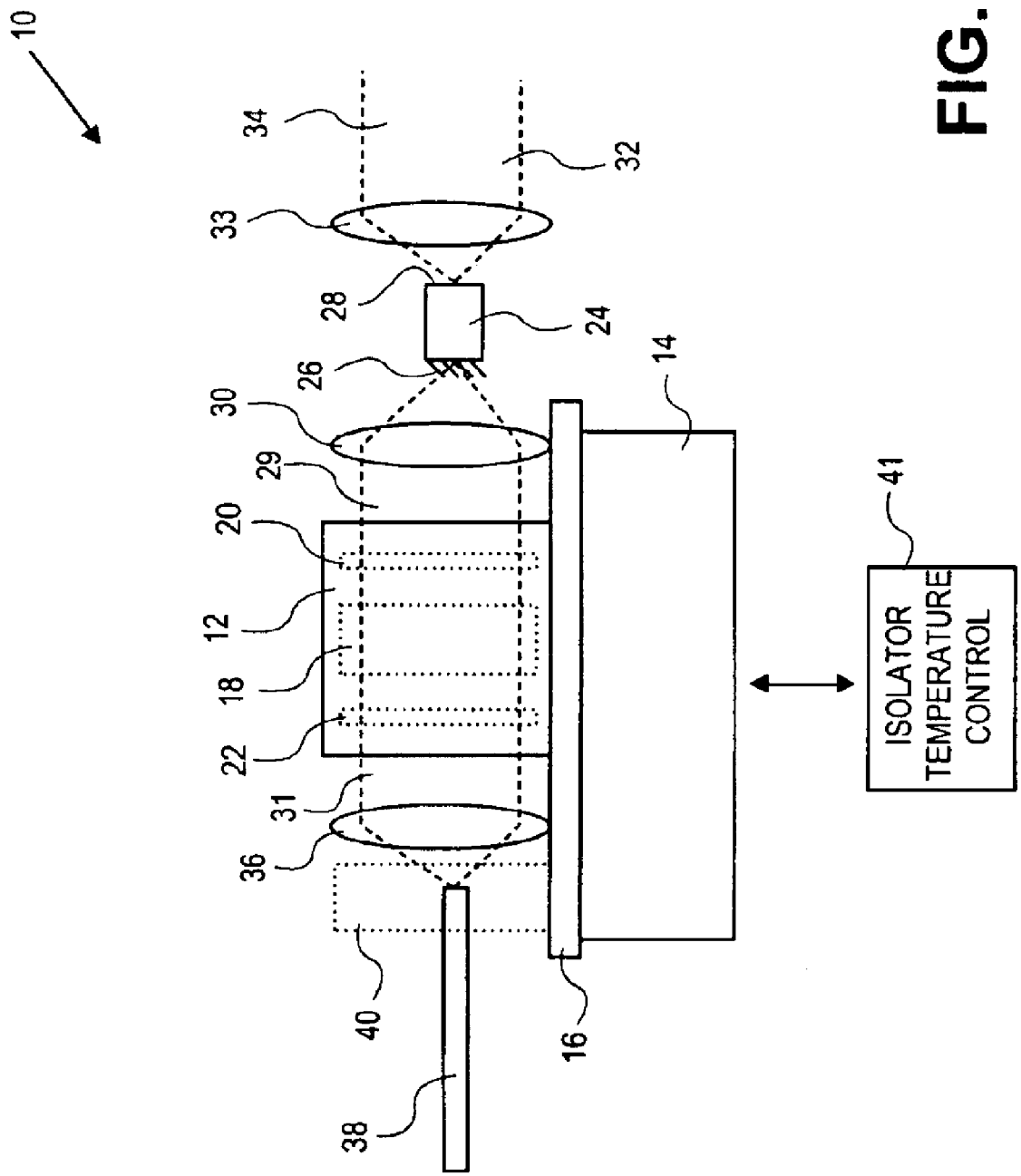
FIG. 1 is a schematic side view of an optical isolator apparatus in accordance with the invention.

The invention provides methods and apparatus for optimizing feedback suppression of optical isolators when used with variable wavelength light sources. The methods of the invention comprise, in general terms, positioning an optical isolator in a light beam, and adjusting feedback suppression by the optical isolator according to wavelength of the light beam. The methods may further comprise adjusting wavelength of the light beam, and emitting the light beam by a gain medium.

In certain embodiments, the adjusting the feedback suppression comprises adjusting temperature of the optical isolator. The adjusting temperature of the optical isolator may comprise adjusting temperature of a non-reciprocal rotator associated with the optical isolator. Adjusting temperature of the optical isolator may comprise coupling the optical isolator to a thermal control element, thermally controlling the optical isolator with the thermal control element.

The invention also provides methods of laser operation which may comprise emitting a first light beam from a first facet of a gain medium, emitting a second light beam from a second facet of the gain medium, positioning a wavelength selection element in the first light beam, feeding back light of a selected wavelength to the gain medium by the wavelength selection element, positioning an optical isolator in the first light beam, and adjusting feedback suppression by the optical isolator according to the wavelength of the light fed back to the gain medium.

The apparatus of the invention comprise, in general terms, an optical isolator, and a control element coupled to the optical isolator and operable to adjust feedback suppression of the optical isolator. The control element may comprise, in certain embodiments, a thermal control element operable to adjust temperature of the optical isolator. The apparatus may further comprise a thermally conductive platform coupled to the optical isolator and to the thermal control element. In certain embodiments, the apparatus comprises a gain medium configured to emit a first light beam, with the optical isolator positioned in the first light beam. The gain medium may be configured to emit a second light beam from a second facet, and the apparatus may further comprise a wavelength selection element positioned in the second light beam and configured to feedback light of a selected wavelength to the gain medium. The optical isolator may comprise a non-reciprocal rotator. The non-reciprocal rotator may comprise a Faraday rotator.

The optical isolation apparatus of the invention may be configured so that optimization of feedback suppression by thermal control of the optical isolator occurs according to adjustment of wavelength of laser output passing through the optical isolator, such that the wavelength at which the isolator provides optimum feedback suppression is matched to the tuned wavelength of the laser. Thus, as the laser is tuned to different wavelengths, optimum feedback suppression is maintained by thermal tuning of the isolator. These and other objects, advantages, and features of the invention will become apparent to those persons skilled in the art upon reading the details of the thermally controlled optical isolator as more fully described below.

Referring more specifically to the drawings, for illustrative purposes the present invention is embodied in the apparatus and method shown in FIG. 1 through FIG. 6. It will be appreciated that the apparatus may vary as to configuration and as to details of the parts, and that the method may vary as to details and the order of events, without departing from the basic concepts as disclosed herein. The invention is disclosed primarily in terms of use with an external cavity laser. However, it will be readily apparent to those skilled in the art that the invention may be used with other types of lasers and optical systems. The relative sizes of components and distances therebetween as shown in the drawings are in many instances exaggerated for reason of clarity, and should not be considered limiting. Any definitions herein are provided for reason of clarity and should not be considered as limiting, and any technical and scientific terms used herein are intended to have the same meaning as commonly understood by those skilled in the art. It also should be understood that the terminology used herein is for the purpose of describing particular embodiments only, and is not intended to be limiting.

Referring first to FIG. 1, there is shown an optical isolation apparatus 10 in accordance with the invention. The apparatus 10 includes an optical isolator 12, a thermal control element shown as a thermoelectric controller 14, and a thermally conductive substrate or platform 16. Isolator 12 and thermoelectric controller 14 are coupled to platform, and are thermally coupled together via platform 16 such that the temperature of isolator 12 can be effectively controlled by thermoelectric controller 14. The optical isolator 12 shown in FIG. 1 includes a non-reciprocal rotator 18 and first and second linear polarizers 20 and 22 respectively. Optical isolator 12 may in some embodiments also include a reciprocal rotator (not shown) such as a quartz rotator.

The apparatus 10 is shown with a gain medium 24, which may comprise a conventional Fabry-Perot diode emitter chip. In the embodiment shown, gain medium 24 is configured for use with an external cavity laser (not shown), and has a partially reflective first facet 26 and an anti-reflection (AR) coated second facet 28. The gain medium 24 emits a first coherent beam 29 from first facet 26 that is collimated by lens 30 along a first optical path 31, and a second beam 32 from second facet 28 that is collimated by lens 33 to define a second optical path 34. The optical isolator 12 is positioned in the first optical path 31. A lens 36 positioned in optical path 31 after isolator 12 focuses beam 29 into an optical fiber 38. Fiber 38 is supported by a ferrule 40, which may be mounted on platform 16. Second beam 32 is directed towards wavelength selective feedback components (not shown), as described further below.

In certain embodiments, non-reciprocal rotator 18 comprises a Faraday Rotator 18 made of a ferromagnetic material. The optical rotator 18 may comprise, for example, a ferroelectric material based on bismuth iron garnet (BIG), terbium gallium garnet (TGG) or like material that is capable of imparting non-reciprocal polarization rotation to light traveling through isolator 12. Other high strength, rare earth permanent magnets, electromagnets, or other permanent magnetic elements may also be used for rotator 18 to produce a uniform polarization rotation. The amount of polarization rotation in a Faraday rotator may be described by $$\theta = V \int H_z dz$$

wherein $\theta$=polarization rotation angle, V=the "Verdet" constant of the rotator material, $H_z$=the longitudinal component of a magnetic intensity vector, and z=optical path length through the rotator 18. Uniform polarization rotations of 45° or more may be obtained with some ferroelectric materials. The characteristics that are often looked for in a non-reciprocal Faraday rotator material include a high Verdet constant, low absorption coefficient, low non-linear refractive index and high damage threshold. The two most commonly used materials for a wavelength range of 700-1100 nanometers are terbium doped borosilicate glass and terbium gallium garnet crystal (TGG). Desirable characteristics for polarizers 20, 22 include high damage threshold, high extinction ratios, low transmission losses and near Brewster angle entrance and exit faces.

The output light beam 29 emitted by gain medium 24 along optical path 31 is highly polarized in nature, and first linear polarizer 20 is positioned in polarization alignment with output beam 29 such that output beam 29 is effectively passed by polarizer 20. As output beam 29 passes through non-reciprocal rotator 18, a rotation in polarization orientation of $\theta$ degrees is imparted to beam 29 by rotator 18. Second linear polarizer 22 is rotated by $\theta$ degrees with respect to first linear polarizer 20, such that second polarizer 22 effectively passes beam 29 (which has been rotated $\theta$ degrees by rotator 18). Thus, optical isolator 12 effectively passes output beam 29 with nominal loss, while imparting a rotation of $\theta$ degrees to the beam 29 before it is focused into fiber 38 by lens 36.

Fiber 38 carries output beam 29 to a desired destination for use. It is possible for unintended, unwanted feedback from fiber 38 to travel back along output path 31 towards gain medium 24. Feedback of this sort may arise from strain-induced reflection and/or diffraction of light by the fiber 38 itself, by a non-optimal coupling at the remote end (not shown) of fiber 38, or other event. Spurious feedback to the gain medium 24 is undesirable and can interfere with external cavity laser operation. Feedback from fiber 38 that is substantially rotated from a polarization orientation of $\theta$ degrees is rejected by linear polarizer 22, which is oriented at $\theta$ degrees as noted above. Feedback from fiber that arises from reflection of beam 29 may substantially retain the polarization rotation orientation of $\theta$ degrees imparted to the outward traveling beam 29, and such reflective feedback will be passed by linear polarizer 22 to rotator 18. Since rotator is non-reciprocal, a change polarization orientation of $\theta$ degrees is imparted to the reflective feedback, so that the reflective feedback, as it reaches the first linear polarizer 20, is rotated by $2\theta$ degrees with respect to linear polarizer 20, and is not passed by linear polarizer 20. In this manner, optical isolator 12 prevents spurious feedback from returning to gain medium 24.

The amount of polarization rotation imparted to a beam by a non-reciprocal rotator is generally wavelength specific, such that a greater degree of polarization rotation will be imparted to a light beam at a specific wavelength, while light at different wavelengths undergoes polarization rotation to a lesser degree, with the degree or level of polarization rotation dropping off as wavelength moves away from the specific wavelength. As less polarization rotation is imparted to outward traveling light and returning reflective feedback, an increasing amount of reflective feedback may pass through the isolator and return to the gain medium.

This wavelength specificity is an undesirable property, as external cavity lasers are increasingly able to provide tuning over larger wavelength ranges, which can be as large as the entire gain bandwidth of the laser gain medium. Optical isolators previously used with tunable lasers have generally been selected for optimum polarization rotation (and hence optimum feedback suppression) at the center wavelength of the tunable wavelength range, with decreasing effectiveness of feedback suppression occurring as laser wavelength is tuned away from the center wavelength.

The problem of wavelength specificity in the feedback suppression of optical isolators is overcome in the present invention by adjusting the optical isolator, according to the wavelength of the light passing through the isolator, such that the wavelength to which the optical isolator provides optimal feedback suppression corresponds to the wavelength of the feedback light to be suppressed. Where the invention is used in association with a tunable laser such as an external cavity laser, adjustment of the optical isolator may be made according to adjustment or tuning of the output wavelength of the laser. Adjustment of the optical isolator may be carried out by any mechanism, effect or technique that can selectively alter the rotation of polarization orientation provided by the non-reciprocal rotator of the isolator. In the embodiments described herein, thermal tuning of the optical isolator is used to optimize isolator feedback suppression according to selected wavelength. It is contemplated however, that electro-optic, piezo-optic, acousto-optic, mechanical and/or other adjustment mechanisms may alternatively, or additionally, be used for adjustment of an optical isolator to optimize feedback suppression. Faraday rotation depends on several parameters, including refractive index, wavelength dispersion of refractive index, and other properties. Both the refractive index and the dispersion are temperature dependent, and thermal or temperature control of the isolator provides good feedback suppression control in accordance with the invention.

Figure 2:
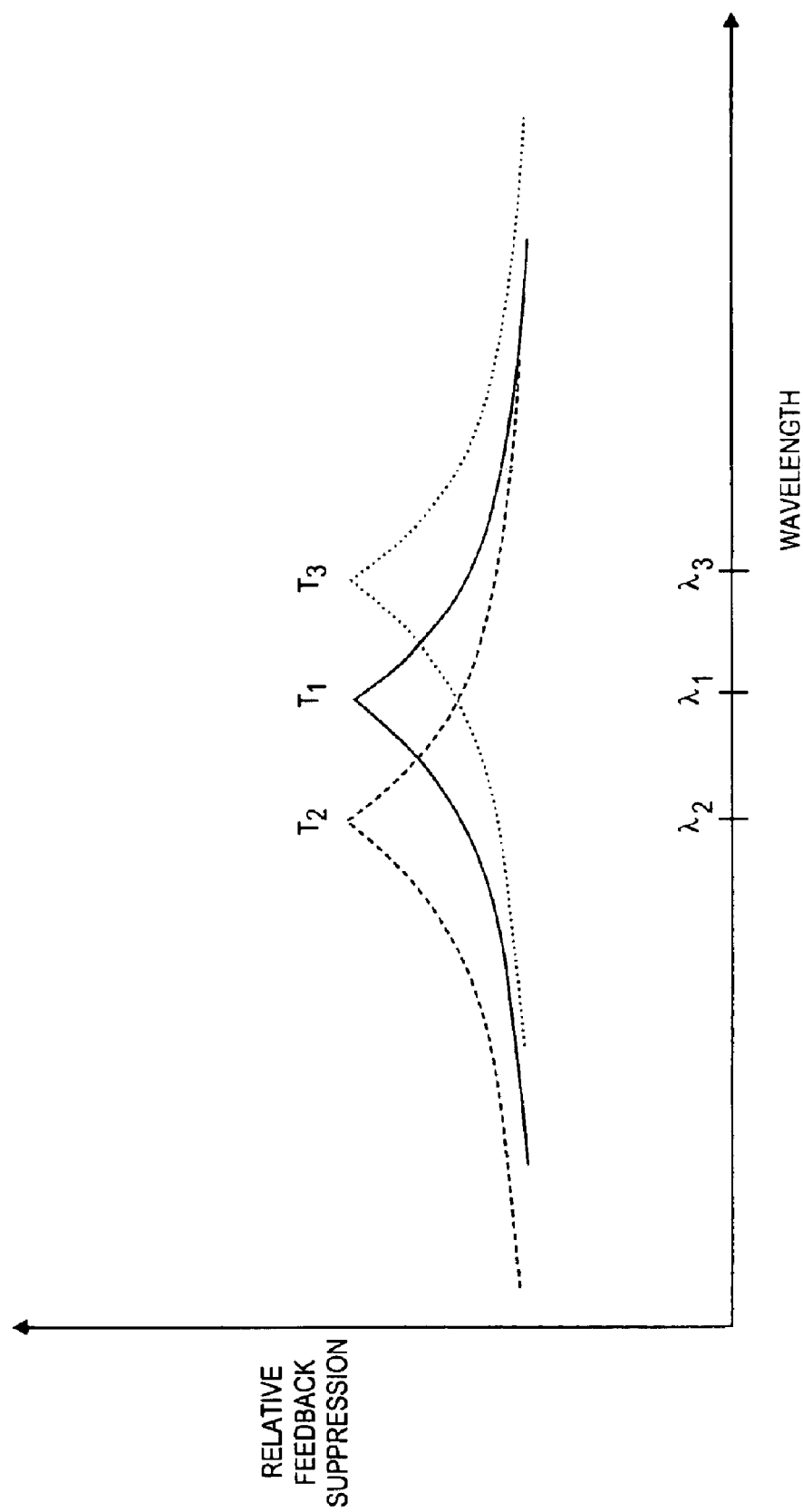
FIG. 2 is a graphical representation of relative feedback suppression vs. wavelength for the optical isolator apparatus of FIG. 1 that illustrates thermal control of isolator feedback suppression in accordance with the invention.

Referring to FIG. 2, there is shown a graphical representation of relative isolation or isolator feedback suppression versus wavelength for the isolator apparatus 10 of FIG. 1 at three different temperatures $T_1$, $T_2$, and $T_3$. Feedback suppression as shown in FIG. 2 corresponds generally to the relative transmission allowed or provided by the optical isolator 12 to light returning through isolator 12 along path 31 towards gain medium 24. The three temperatures $T_1$, $T_2$ and $T_3$ result in optimal feedback suppression by isolator 12 at wavelengths $\lambda_1$, $\lambda_2$ and $\lambda_3$ respectively, and may be achieved by heating or cooling isolator 12 by thermoelectric controller 14 through thermally conductive substrate 16. The wavelength range shown in FIG. 2 may correspond to, for example, the "C" band of the ITU wavelength grid (approximately 1525 nanometers to approximately 1656 nanometers), or the gain band width of gain medium 24, with $\lambda_1$ representing the center wavelength of the wavelength range. When, for example, beam 29 is at wavelength $\lambda_1$, optical isolator 12 provides optimal feedback suppression when isolator 12 is thermally adjusted or tuned to temperature $T_1$. When beam 29 is adjusted to shorter wavelength $\lambda_2$ by wavelength selection techniques such as those described below, optimal feedback suppression by isolator 12 is thermally adjusted by cooling to temperature $T_2$, and similarly for a longer wavelength $\lambda_3$, heating of isolator 12 to temperature $T_3$ results in optimal feedback suppression. Commercially available optical isolators can provide effective isolation or feedback suppression over the entire C-band (approximately 1525 to 1565 nanometers) with temperature control over a range of from about 14° C. to about 44° C.

An isolator temperature controller or control element 41 may be included in the apparatus 10 and operatively coupled to thermoelectric controller 14 to provide control signals thereto so that temperature adjustment to isolator 12 may be made according to adjustments in the wavelength of beam 29. Isolator temperature control element 41 may, for example, be operatively coupled to a sensor (not shown) that monitors beam wavelength, so that control element 41 can direct temperature adjustment of isolator via thermoelectric controller 14 according to detected wavelength. A wavelength sensor or monitoring system that may be used with the invention is disclosed in U.S. patent application entitled "WAVELENGTH REFERENCE APPARATUS AND METHOD to inventors Mark McDonald et al., co-filed simultaneously herewith, and incorporated herein by reference. Other wavelength monitoring systems may alternatively be used. In other embodiments, control element 41 may be operatively coupled to a wavelength selection control element (not shown) associated with an external cavity laser that generates beam 29. When the output wavelength of the external cavity laser is changed to a selected wavelength, control element 41 may use lookup table values or other stored information to make an appropriate thermal adjustment to isolator 12 according to the selected wavelength.

The coupling of isolator 12, as well as lenses 30, 36 and ferrule 40, to a single thermally controlled platform allows effective temperature control of isolator 12 by thermoelectric controller 14, and also provides for mechanical stability of the apparatus 10 and easy optical alignment of lenses 30, 36, isolator 12 and fiber 38. Many other possible arrangements for the thermal control of isolator 12 are possible and may be used with the invention. For example, a heating coil or other thermal control element (not shown) may be coupled directly to isolator 12, and in some embodiments of the invention, a thermal control element may be coupled directly to non-reciprocal rotator 18 to provide temperature control thereto.

The thermal coupling of optical isolator 12 to thermoelectric controller 14 through thermally conductive platform 16 allows thermal control of a variety of commercially available optical isolators without any modification thereof, by simply mounting the isolator 14 onto platform 16 using a thermally conductive adhesive or solder. Platform 16 may comprise any thermally conductive material. Metal nitrides and metal carbides provide good thermal conductivity and a relatively small coefficient of thermal expansion, with aluminum nitride being the presently preferred material for platform 16. Various other materials may also be used, however.

Figure 3:
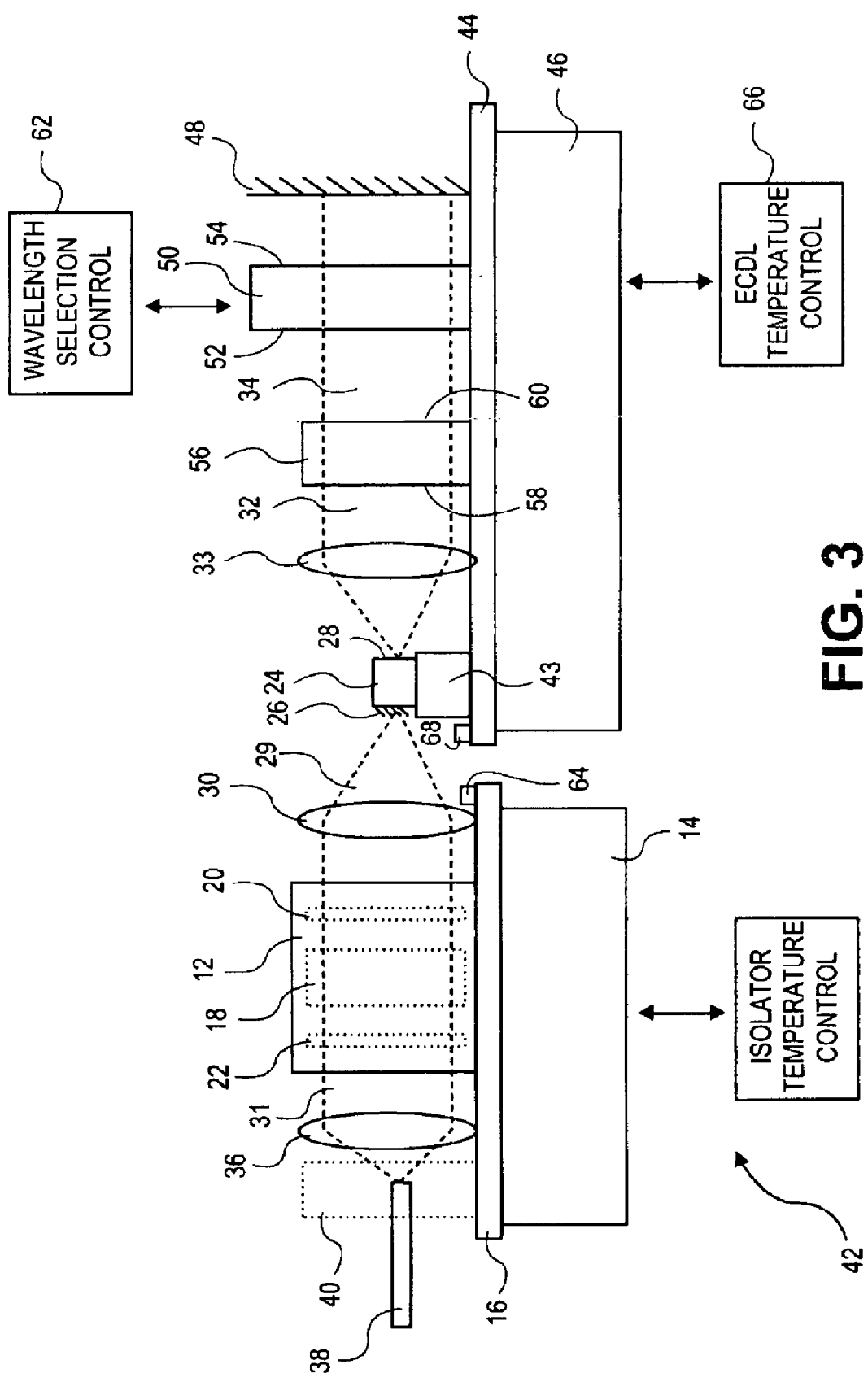
FIG. 3 is a schematic side view of the optical isolator apparatus of FIG. 1 with an external cavity laser apparatus in accordance with the invention.

Referring now to FIG. 3, there is shown an external cavity laser apparatus 42 in accordance with the invention, wherein like reference numbers are used to denote like parts. In the apparatus 42, gain medium 24 is mounted on a thermally conductive carrier 43. Carrier 43 is mounted on platform 44, which in turn is mounted on a thermoelectric controller 46 for thermal control of gain medium 24 as described below. The beam 32 emitted by facet 28 of gain medium 24 is collimated by lens 33 along optical path 34 to a reflective element 48 that is also mounted on platform 44. Reflective element 48 may comprise a mirror, grating, prism or other reflector or retroreflector. An external laser cavity is defined by facet 26 and reflective element 48. The output beam 29 from facet 26 of gain medium 24 collimated by lens 30 along path 31 through isolator 12, and is focused by lens 36 into optical fiber 38 that is mounted in ferrule 40 as described above.

A wavelength selection element 50 is included in the laser apparatus 10 and is shown positioned in optical path 34 between gain medium 24 and end reflector 46. Wavelength selection element 50 may be coupled to platform 44 or unsupported by platform 44. Wavelength selection element 50 may comprise one or more etalons, gratings, prisms or other element or elements that are capable of providing feedback to gain medium 24 along path 34 at a selected wavelength. In the embodiment of FIG. 3, wavelength selection element 50 is shown as an etalon with faces 52, 54, and operates as a Fabry-Perot interference filter. Wavelength selection element 50 is configured to have a free spectral range such that the interference between faces 52, 54 results in a single transmission peak within a wavelength range of interest such as, for example, the gain bandwidth of gain medium 24, the wavelength range of the ITU (International Telecommunications Union) C-band (approximately 1525 nanometers to 1565 nanometers), or other wavelength range.

The apparatus 42 includes a grid generator, shown as a grid etalon 56 with parallel reflective faces 58, 60, that is positioned in path 34. Grid etalon 56 may be coupled to platform 44 or unsupported by platform 44. Grid etalon 56 also operates as a Fabry-Perot interference filter, with the refractive index of grid etalon 56 and the spacing of faces 58, 60 providing a free spectral range that gives rise to a plurality of transmission peaks that define a wavelength grid of selected channel wavelengths. The wavelength grid may comprise, for example, the ITU (International Telecommunications Union) grid. Other wavelength grids may alternatively be selected according to the configuration of grid etalon. Grid etalon 56 has a finesse (free spectral range divided by full width half maximum or FWHM) that suppresses modes of the external cavity defined by facet 26 and end reflector 48 that are adjacent to channel wavelengths of the wavelength grid.

Wavelength selection element 50 has a finesse such that when wavelength selection element is tuned or adjusted to select one of the channels of the wavelength grid, lasing at channels adjacent to the selected wavelength is suppressed. The single transmission peak provided by wavelength selection element 50 thus allows feedback of light at the transmission peak wavelength, while suppressing potential feedback at other wavelengths which may arise due to modes associated with the external cavity defined by gain medium facet 26 and end reflector 48 and the transmission maxima associated with unselected channels that are provided by grid generator 56.

A wavelength selection control element 62 is operatively coupled to wavelength selection element 50, and provides control signals thereto for adjustment or selection of the wavelength of the transmission peak defined by wavelength selection element 50, and hence the wavelength of light that is fed back to gain medium 24 and ultimately emitted as output along beam 29. Wavelength selection element 50 may be tunable by various mechanisms, including thermo-optic, electro-optic, acousto-optic, and piezo-optic tuning, mechanical angle tuning, strain-based tuning, other tuning mechanism or combination of tuning mechanisms, in order adjust the wavelength of the light that is returned to gain medium 24 along path 34. The use of mechanically tuned tapered interference filters and wedge-shaped etalons, transmissive and reflective gratings, and electro-optically tuned etalons for wavelength selection is described, for example, in U.S. patent application Ser. No. 09/814,464. The use of reflective gratings for wavelength selection is also described in U.S. patent application Ser. No. 10/099,730. The use of thermo-optically tuned etalons and etalons of birefringent material is related in U.S. patent application Ser. No. 10/099,649. The aforementioned disclosures are incorporated herein by reference. In embodiments where a reflective grating is used, end reflector 48 may be positioned in a Litmann-Metcalf arrangement to return a selected diffraction back to the gain medium 24. Alternatively, in a Littrow arrangement, end reflector 48 may be omitted, as the grating is positioned to return a selected diffraction directly to the gain medium 24. Other types of wavelength selection elements and tuning mechanisms therefore may suggest themselves to those skilled in the art and are considered to be within the scope of this disclosure.

In operation of the laser apparatus 42, current is applied to gain medium 24 in a conventional manner. The beam 32 emitted from facet 28 of gain medium 24 travels path 34 and passes through or otherwise interacts with wavelength selection element 50. Light at the selected wavelength is returned along path 34 to gain medium 24 to provide for lasing at the selected wavelength. The output beam 29 from facet 26 is directed along output path 31 through isolator 12 and focused by lens 36 into fiber 38 for use elsewhere as noted above. Isolator temperature control element 41 provides control instructions to thermal controller 14 according to the selected wavelength defined by wavelength selection element 50. Isolator temperature control element 41 may in this regard be operatively coupled to wavelength selection control element 62.

A thermistor 64 or other temperature sensor may be used in association with isolator 12 to monitor isolator temperature. Thermistor 64 is operatively coupled to isolator thermal control element 41, and if thermistor 64 detects a deviation from a selected or predetermined temperature, control element 41 may can adjust thermoelectric controller 14 to bring isolator to the desired temperature.

In the embodiment of FIG. 3, a single platform or base 44 supports gain medium 24 and end reflector 48, as well as lens 32, grid etalon 56 and wavelength selection control element 50. Use of a common platform to support the optical components of an external cavity laser imparts vibration stability and facilitates assembly and alignment of the gain medium 24, lens 33 grid etalon 56, wavelength selection control element 50 and end reflector 48. The use of a common platform in this manner for the components of an external cavity laser is also described in the U.S. Patent Application entitled "MICRO OPTICAL BENCH FOR MOUNTING PRECISION ALIGNED OPTICS, OPTICAL ASSEMBLY AND METHOD OF MOUNTING OPTICS" to inventors Khiem Do et al., simultaneously co-filed herewith, the disclosure of which is incorporated herein by reference.

External cavity tuning may be used in the apparatus 42 to provide fine tuning of a selected wavelength via optimizing the relationship of external cavity modes with the transmission peak of wavelength selection element 50. The external cavity modes may be adjusted by physical adjustment of the spacing between facet 26 and end reflector 48, and/or by adjusting the refractive index of material present in the external cavity. Semiconductor gain media materials such as InGaAs and InGaAsP have generally high refractive indices and thus provide an important component of the overall external cavity optical path length. Gain media materials also exhibit relatively large changes in refractive index with respect to temperature, and gain medium refractive index adjustment can be effectively carried out by temperature control of gain medium 24.

Gain medium 24 is thermally coupled to thermoelectric controller 46 via thermally conductive platform 44 and thermally conductive carrier 43. Gain medium 24 can thus be temperature adjusted, by heating or cooling introduced from thermoelectric controller, to adjust gain medium refractive index, and hence external cavity optical path length. A temperature control element 66 may be operatively coupled to thermoelectric controller 46 to provide control signals thereto for selective temperature adjustment of gain medium 24 for external cavity optical path length adjustment. A thermistor or other temperature sensor 68 may be included on platform 44 and operatively coupled to control element 66. Thermistor 68 monitors the temperature of platform 44 (and thus gain medium 24), and if a deviation from a selected temperature is sensed by thermistor 68, appropriate corrective temperature adjustment may be made by control element 66 and thermoelectric controller 44.

Both gain medium 24 and end reflector 48 are mounted on platform 44, and the material of platform may be selected to provide a coefficient of thermal expansion such that heating and cooling of platform 44 by thermoelectric controller 46 provides a corresponding expansion and contraction of platform 44 to adjust the physical separation of gain medium facet 26 and end reflector 48, and hence provide adjustment of the external cavity optical path length. The adjustment of the spacing of gain medium facet 26 and end reflector 48 in this manner may be carried out together or simultaneously with the thermal adjustment of gain medium refractive index to provide for external cavity optical path length adjustment. Alternatively, gain medium 24 may be thermally isolated from platform 44 such that thermal adjustment of external cavity optical path length is carried out by spacing of gain medium facet 26 and end reflector 48 alone. The use of temperature control of external cavity optical path length is also described in the U.S. Patent Application entitled "EXTERBAK CAVITY LASER APPARATUS AND METHODS to inventors Andrew Daiber et al,. simultaneously co-filed herewith, the disclosure of which is incorporated herein by reference.

Figure 4:
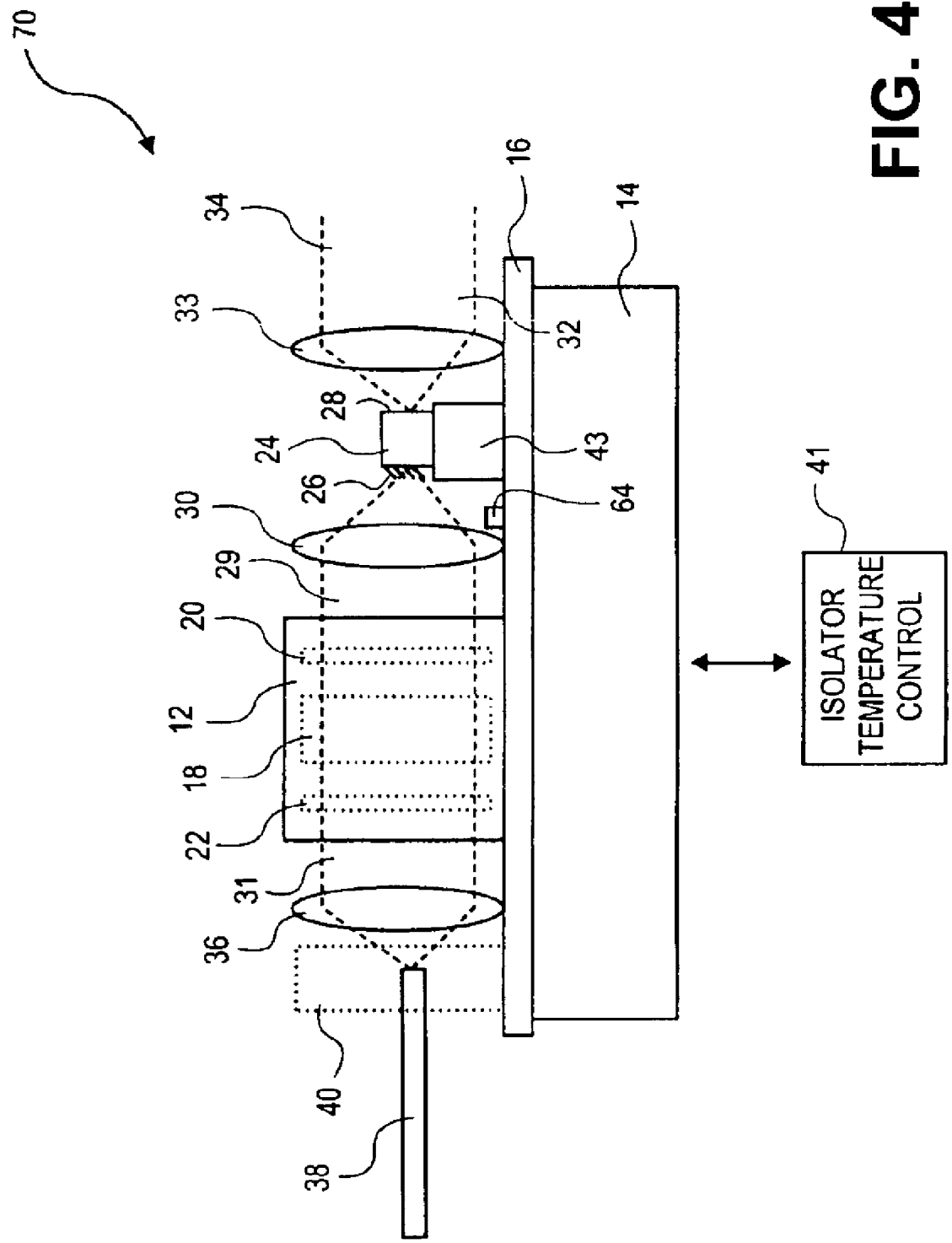
FIG. 4 is a schematic side view of another embodiment of an optical isolator apparatus in accordance with the invention.

Referring now to FIG. 4, an alternative embodiment of an optical isolator apparatus 70 in accordance with the invention is shown, wherein like reference numbers denote like parts. In the apparatus 70, gain medium 24 and carrier 43, as well as optical isolator are mounted a common thermally conductive platform 16 and thermally coupled to thermoelectric controller 14 through platform 16, such that gain medium 24 and isolator 12 are subject to common thermal control by thermoelectric controller 14 and control element 41. A wavelength selection element and end reflector element (not shown) may be positioned in the path 34 of beam 32 as described above to provide a tunable external cavity laser in association with the apparatus 70.

The apparatus 70 provides a stable platform for assembly and alignment of gain medium 24 together with isolator 12, lenses 30, 36 and ferrule 40. During operation and as gain medium 24 is current-pumped, the thermoelectric controller 14 cools substrate or platform 16 to counteract the heat generated by gain medium 24 during operation. Since gain medium 24, lenses 30, 33, 36 and isolator 12 are thermally coupled to thermoelectric controller 14 via platform 16, they can be maintained at a constant or substantially constant temperature, thereby preventing mis-alignment or mis-registration due to thermal fluctuation. Cooling of gain medium 24 during laser operation via platform 16 and thermoelectric controller 14 also helps avoid thermal degradation and aging of the anti-reflection coating on facet 28. When the apparatus 70 is not in use, gain medium 24, lenses 30, 33, 36 and isolator 12, collimator 80 can be maintained at a constant temperature by thermoelectric controller 14 and platform 16 so that the various optical surfaces on these components are at a higher temperature than any surrounding or adjacent surfaces. The maintenance of a higher temperature for the components on substrate 74 during power-down periods helps avoid condensation of moisture or volatile organic compounds on important optical surfaces.

The use of a common platform for a gain medium with optical output components in this manner is also described in U.S. patent application Ser. No. 09/900,429, incorporated herein by reference. In the embodiment of FIG. 4, material selection for rotator 18 and gain medium 24 may be made such that the heating and cooling simultaneously imparted to isolator 18 and gain medium 24 is optimal for both adjustment of feedback suppression by isolator 12 and for external cavity optical path length adjustment as described above.

Figure 5:
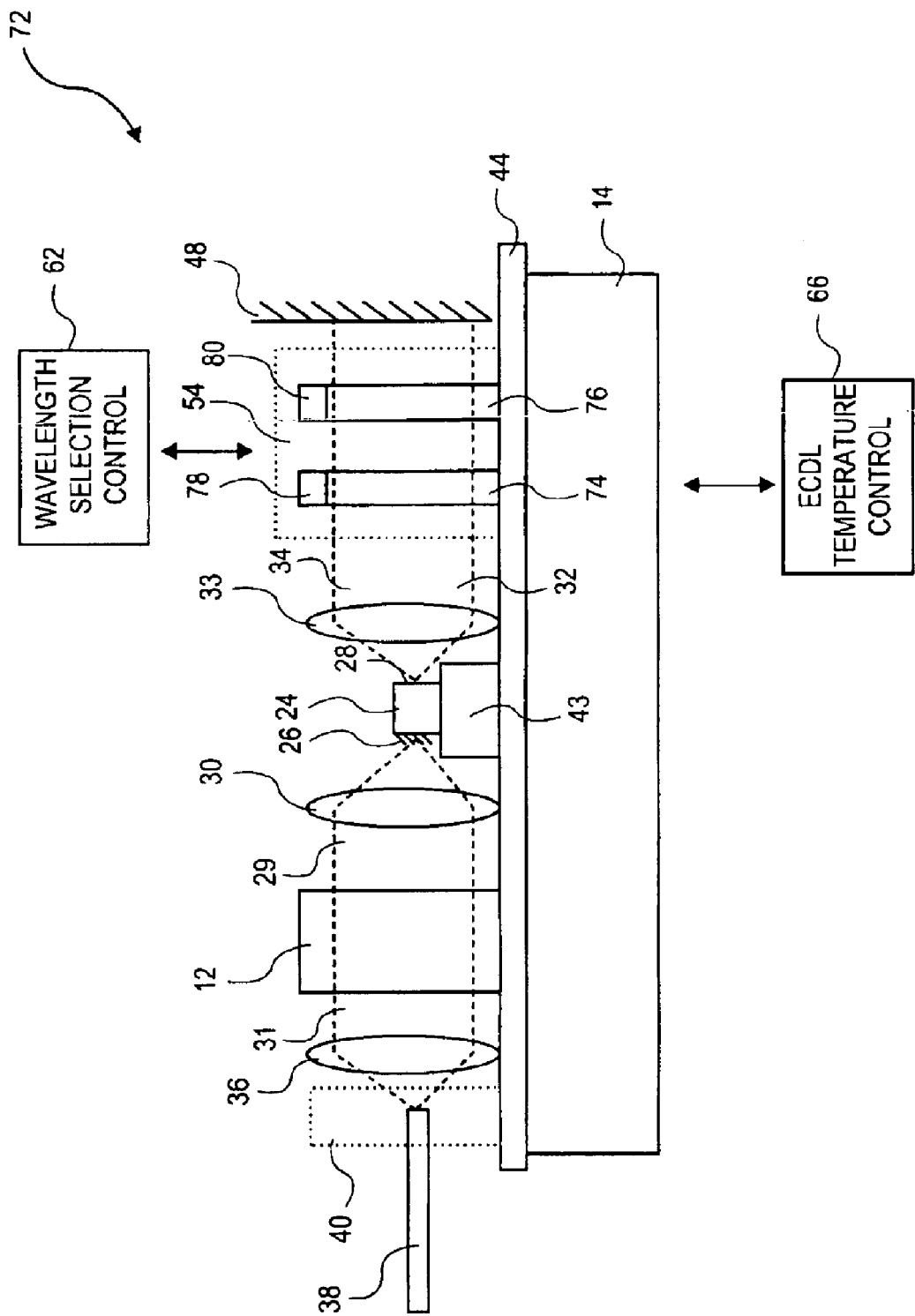
FIG. 5 is a schematic side view of another embodiment of an external cavity laser apparatus in accordance with the invention.

Referring now to FIG. 5, there is shown another embodiment of an external cavity laser apparatus 72 in accordance with the invention, wherein like reference numbers denote like parts. In the apparatus 72, all of the components associated with the external cavity laser and optical output are mounted on a common platform 44. Thus, ferrule 40, isolator 12, lenses 30, 33, 36, gain medium 24, wavelength selection apparatus 50 and end reflector 48 are each mounted on or coupled to platform 44. This arrangement provides a mechanically stable assembly of all components and facilitates alignment of components in beams 29, 32 emitted by gain medium 24. Common thermal control to the various components on platform 44 may be applied by thermoelectric controller and temperature control element 66 in the manner described above.

In the apparatus 72, wavelength selection element 50 is shown as a pair of thermo-optically tunable etalons 74, 76 that are respectively coupled to control elements 78, 80. The use of dual tunable etalons allows wavelength selection via Vernier tuning wherein etalons 74, 76 each have a different free spectral range, and each define a plurality of transmission peaks that operate together to define a joint transmission peak. The joint transmission peak is adjustable by adjustment of etalons 74, 76 by control elements 78, 80 according to instructions from wavelength selection control 62. Such control may comprise thermal or other adjustment as described above, to alter the free spectral ranges of etalons 74, 76. The use of multiple tunable etalons for wavelength selection is described in U.S. patent application Ser. No. 10/099,649, which is incorporated herein by reference. It is noted again that any wavelength selection element may be used with the invention, and the specific embodiments described herein are only exemplary.

Figure 6:
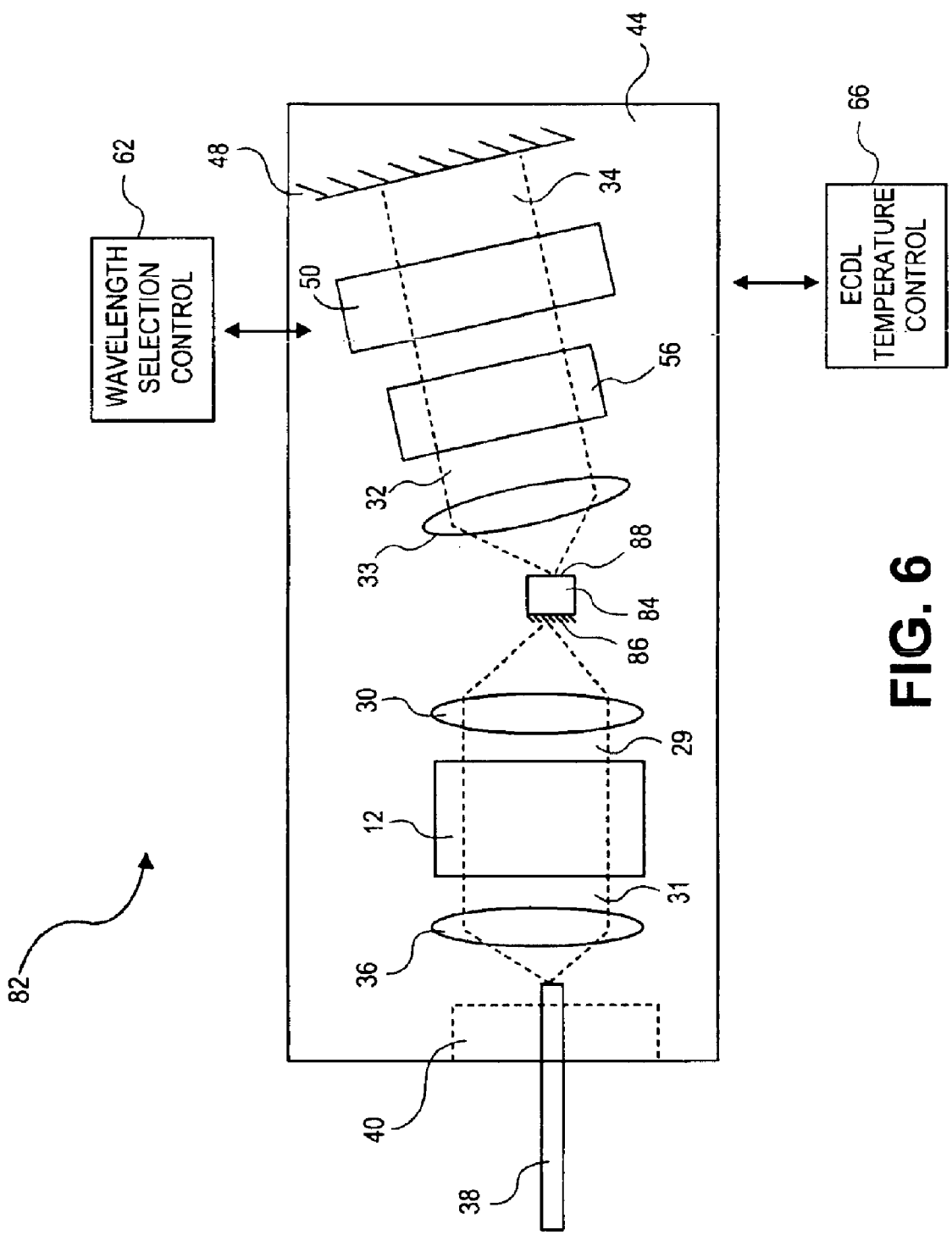
FIG. 6 is a schematic side view of another embodiment of an external cavity laser apparatus in accordance with the invention.

FIG. 6 shows yet another embodiment of an external cavity laser apparatus 82 in accordance with the invention, wherein like reference numerals denote like parts. In the apparatus 82, a bent waveguide gain medium 84 is utilized, with non-parallel facets 86, 88 respectively emitting light beams 29, 32 respectively along paths 31, 34, which are not co-linear due to the configuration of gain medium 84. Beam 32 is collimated by lens 30 along path 34 to wavelength selection element 50 and end reflector 48 as noted above, and beam 29 is collimated by lens 30 along path 31 through optical isolator 12, and then focused in to fiber 88 by lens 36. Ferrule 40, isolator 12, lenses 30, 33, 36, gain medium 84, wavelength selection apparatus 50, grid generator 56 and end reflector 48 are each mounted on or coupled to a common thermally conductive platform 90. Isolator 12 is thermally adjustable by temperature control through platform 90 by a thermoelectric controller (not shown) to optimize feedback suppression in the manner described above.

While the present invention has been described with reference to the specific embodiments thereof, it should be understood by those skilled in the art that various changes may be made and equivalents may be substituted without departing from the true spirit and scope of the invention. In addition, many modifications may be made to adapt a particular situation, material, composition of matter, process, process step or steps, to the objective, spirit and scope of the present invention. All such modifications are intended to be within the scope of the claims appended hereto.

What is claimed is:

1. An apparatus, comprising:
    (a) a laser source configured to emit a first light beam from a first output facet along a first optical path and a second light beam from a second output facet alone a second optical path;
    (b) a wavelength selection element positioned in said second optical path to feedback light having a selected wavelength to said laser source;
    (c) an optical isolator positioned in said first optical path to receive said first light beam, said optical isolator having an optimal suppression wavelength; and
    (d) a thermal control element thermally coupled to said optical isolator to adjust said optimal suppression wavelength to coincide with said selected wavelength via temperature control of said optical isolator.

2. The apparatus of claim 1, wherein said optical isolator comprises a non-reciprocal rotator.

3. The apparatus of claim 2, wherein said non-reciprocal rotator comprises a Faraday rotator.

4. The apparatus of claim 1, further comprising a grid generator positioned in said second optical path.

5. The apparatus of claim 4, wherein said grid generator comprises a grid etalon.

6. The apparatus of claim 1, wherein said wavelength selection element comprises at least one etalon.

7. The apparatus of claim 1, wherein said wavelength selection element comprises a grating.

8. The apparatus of claim 1, further comprising an optical fiber positioned to receive said first light beam from said optical isolator, said optical isolator to suppress optical feedback from said optical fiber before reaching said laser source.

9. A method of operation, comprising:
    generating an optical beam with a laser source;
    tuning the laser source to select a first wavelength for the optical beam;
    adjusting an optimal suppression wavelength of an optical isolator to coincide with the first wavelength and to suppress optical feedback to the laser source about the first wavelength;
    tuning the laser source to select a second wavelength for the optical beam; and
    adjusting the optimal suppression wavelength of the optical isolator to coincide with the second wavelength and to suppress optical feedback to the laser source about the second wavelength.

10. The method of claim 9, wherein adjusting the optimal suppression wavelength of the optical isolator to coincide with the first wavelength comprises adjusting a temperature of the optical isolator.

11. The method of claim 10, wherein adjusting the temperature of the optical isolator comprises adjusting a temperature of a non-reciprocal rotator.

12. The method of claim 10, wherein generating the optical beam with the laser source comprises emitting first and second portions of the optical beam from corresponding first and second output facets of the laser source.

13. The method of claim 12, wherein adjusting the optimal suppression wavelength of the optical isolator to suppress optical feedback to the laser source about the first wavelength comprises suppressing optical feedback of the first portion of the optical beam reflected back towards the first output facet.

14. The method of claim 13, wherein tuning the laser source to select the first wavelength comprises:
    feeding back at least some of the second portion of the optical beam having the first selected wavelength to the second output facet; and
    selecting the first selected wavelength with a wavelength selection element positioned in a path of the second portion of the optical beam.

15. The method of claim 14, further comprising coupling the first portion of the optical beam into an optical fiber after passing through the optical isolator.

* * * * *

UNITED STATES PATENT AND TRADEMARK OFFICE
CERTIFICATE OF CORRECTION

PATENT NO. : 6,845,121 B2  Page 1 of 1
DATED : January 18, 2005
INVENTOR(S) : McDonald It is certified that error appears in the above-identified patent and that said Letters Patent is hereby corrected as shown below:

Column 11,
Line 16, delete "alone" and insert -- along --.

Signed and Sealed this

Tenth Day of May, 2005

JON W. DUDAS
*Director of the United States Patent and Trademark Office*